United States Patent
Onuma (10) Patent No.: US 11,528,465 B2
(45) Date of Patent: Dec. 13, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazufumi Onuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/196,384

(22) Filed: Mar. 9, 2021

(65) Prior Publication Data

US 2021/0297650 A1    Sep. 23, 2021

(30) Foreign Application Priority Data

Mar. 19, 2020  (JP) .............................. JP2020-048906

(51) Int. Cl.
   *H04N 13/282* (2018.01)
   *G06T 7/55* (2017.01)
   *H04N 13/243* (2018.01)
   *G06T 7/70* (2017.01)

(52) U.S. Cl.
   CPC ............. *H04N 13/282* (2018.05); *G06T 7/55* (2017.01); *G06T 7/70* (2017.01); *H04N 13/243* (2018.05)

(58) Field of Classification Search
   CPC ...... H04N 13/282; H04N 13/243; G06T 7/55; G06T 7/70
   See application file for complete search history.

(56) References Cited

U.S. PATENT DOCUMENTS

| 5,737,031 A * | 4/1998 | Tzidon ................. H04N 5/2222 348/E5.022 |
| 2010/0166294 A1* | 7/2010 | Marrion ............... G06V 10/757 382/154 |
| 2014/0002591 A1* | 1/2014 | Wenxiu .................. G06T 5/005 348/42 |
| 2019/0304076 A1* | 10/2019 | Nina Paravecino .. G06T 7/0002 |
| 2020/0258296 A1* | 8/2020 | Pennings ................ G06T 5/002 |
| 2020/0380762 A1* | 12/2020 | Karafin ................... G06T 17/20 |

FOREIGN PATENT DOCUMENTS

| JP | 2019050593 A | 3/2019 |
| JP | 2020156162 A | 9/2020 |

\* cited by examiner

*Primary Examiner* — Jayanti K Patel
*Assistant Examiner* — Christopher Kingsbury Glover
(74) *Attorney, Agent, or Firm* — Canon U.S.A., Inc. IP Division (57) ABSTRACT

An image processing apparatus for generating a virtual viewpoint image that acquires a parameter for identifying a position and orientation of a first imaging device, acquires three-dimensional shape data of an object that is generated based on a plurality of images acquired by a plurality of second imaging devices different from the first imaging device, and corrects a pixel value of a pixel included in a region corresponding to the object in an image acquired by the first imaging device, based on the position and orientation of the first imaging device identified based on the acquired parameter and the acquired three-dimensional shape data of the object.

10 Claims, 9 Drawing Sheets

IMAGE PROCESSING APPARATUS, IMAGE PROCESSING METHOD, AND STORAGE MEDIUM

BACKGROUND

Field

The present disclosure relates to an image processing technology for generating a virtual viewpoint image.

Description of the Related Art

There is a virtual viewpoint image generation system that is capable of creating an image viewed from a virtual viewpoint designated by a user from images captured by an imaging system with a plurality of cameras. Japanese Patent Application Laid-Open No. 2019-50593 discusses an image processing system that is capable of generating a virtual viewpoint image in accordance with a virtual viewpoint designated by a user. An image processing apparatus (image computing server) discussed in Japanese Patent Application Laid-Open No. 2019-50593 performs foreground and background segmentation processing by which to extract greatly changing parts of images captured by a plurality of cameras as foreground images and extract little changing parts of the same as background images. For example, the image processing apparatus extracts, from captured images of a field where a soccer game is being played, foreground images corresponding to players and a ball and background images corresponding to a surface of the field. The image processing apparatus further estimates and generates a shape of a three-dimensional model of an object based on the extracted foreground images to store the three-dimensional model in a storage device together with the foreground images and the background images. The image processing apparatus then acquires appropriate data from the storage device based on the virtual viewpoint designated by the user and generates a virtual viewpoint image.

If the background images cannot be correctly extracted from the captured images in generation of the virtual viewpoint image, the generated virtual viewpoint image may cause a feeling of strangeness. For example, in a case where the foreground and background segmentation processing is performed on the captured images of the ball in the foreground against spectators' stands in the background, the foreground and the background may not be correctly segmented because there are motions in the spectators' stands as well as the ball. Consequently, the image processing apparatus generates a virtual viewpoint image using the background images where the foreground is reflected in part or in whole, so that the generated virtual viewpoint image may cause a feeling of strangeness due to a residual image of the ball reflected on the spectators' stands.

SUMMARY

The present disclosure is directed to a technology for generating an appropriate virtual viewpoint image.

An image processing apparatus includes one or more memories storing instructions and one or more processors executing the instructions to acquire a parameter for identifying a position and orientation of a first imaging device, acquire three-dimensional shape data of an object that is generated based on a plurality of images acquired by a plurality of second imaging devices different from the first imaging device, and correct a pixel value of a pixel included in a region corresponding to the object in an image acquired by the first imaging device, based on the position and orientation of the first imaging device identified based on the acquired parameter and the acquired three-dimensional shape data of the object.

Further features of the present disclosure will become apparent from the following description of exemplary embodiments with reference to the attached drawings.

DESCRIPTION OF THE EMBODIMENTS

Hereinafter, exemplary embodiments of the present disclosure will be described with reference to the attached drawings. Configurations of the following exemplary embodiments are mere examples, and the present disclosure is not limited to the configurations illustrated in the drawings. Identical structures or processes will be described with identical reference numerals.

Figure 1:
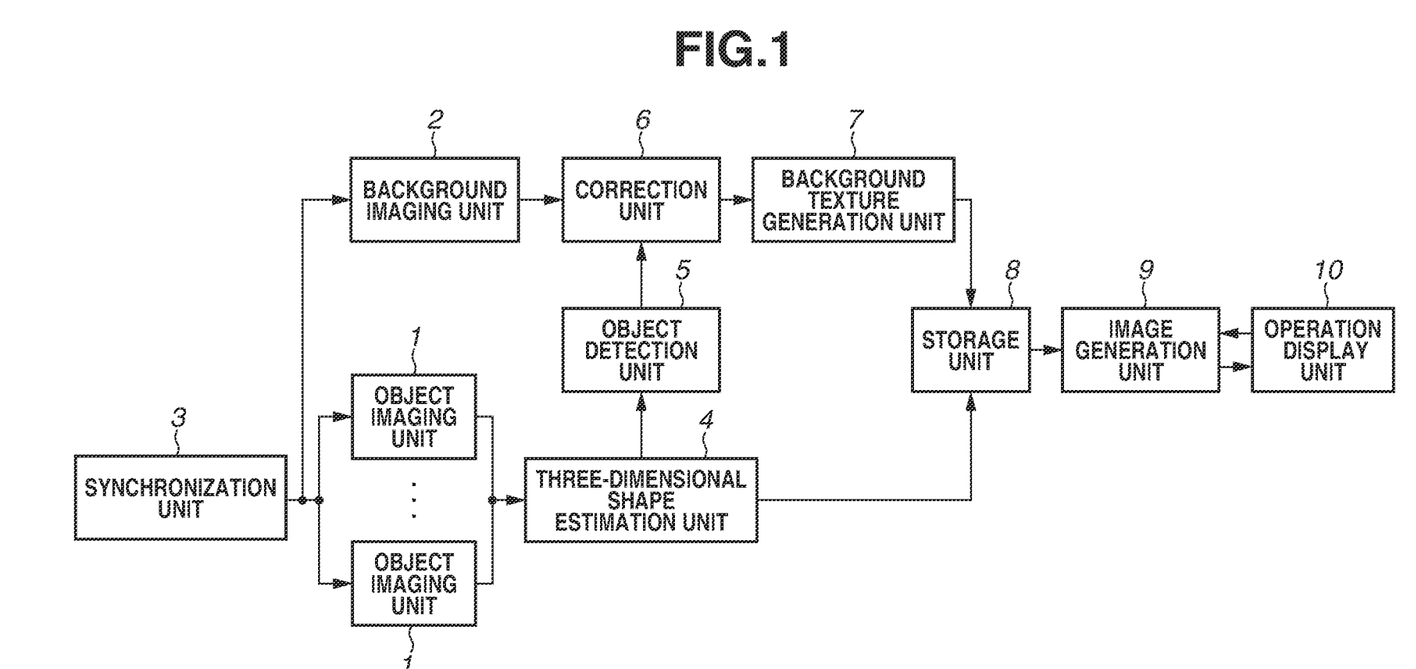
FIG. 1 is a diagram illustrating a configuration example of a system including an image processing apparatus according to one or more aspects of the present disclosure.

FIG. 1 is a diagram illustrating a configuration example of an image processing system including an image processing apparatus according to a first exemplary embodiment. The image processing system illustrated in FIG. 1 includes a plurality of object imaging units 1, a background imaging unit 2, a synchronization unit 3, a three-dimensional shape estimation unit 4, an object detection unit 5, a correction unit 6, a background texture generation unit 7, a storage unit 8, an image generation unit 9, and an operation display unit 10. The image processing system can be configured with one or more electronic devices. Referring to FIG. 1, the image processing apparatus according to the present exemplary embodiment includes, for example, the three-dimensional shape estimation unit 4, the object detection unit 5, the correction unit 6, the background texture generation unit 7, the storage unit 8, and the image generation unit 9.

The plurality of object imaging units 1 and the background imaging unit 2 perform image capturing in high-accuracy synchronization with each other, based on a synchronization signal from the synchronization unit 3.

Figure 2:
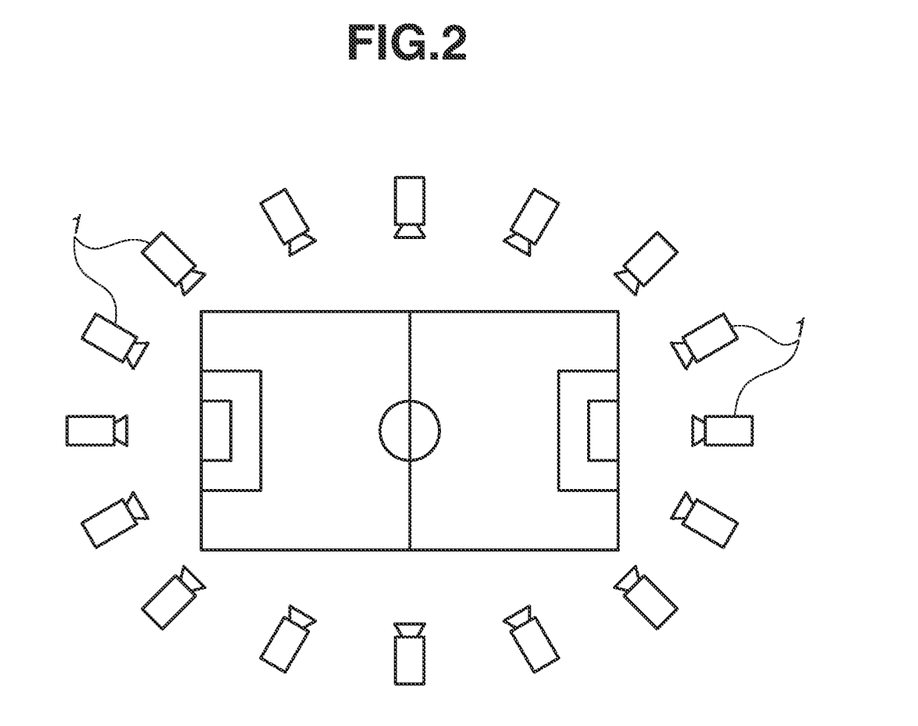
FIG. 2 is a diagram illustrating an arrangement example of object imaging units.

The plurality of object imaging units 1 is each installed mainly at angles of view and in imaging directions to capture images of an object and outputs the captured images to the three-dimensional shape estimation unit 4. The object imaging units 1 are installed to surround a ground of a stadium as illustrated in FIG. 2 in order to capture images of the ground and objects from a plurality of directions, that is, to capture images of the objects and the like from a plurality of viewpoints.

The three-dimensional shape estimation unit 4 uses the plurality of captured images input from the plurality of object imaging units 1, for example, to extract silhouettes of the objects from each of the captured images acquired by the object imaging units 1, and generates three-dimensional models indicating three-dimensional shapes of the objects using a volume intersection method or the like. The three-dimensional models are generated using also extrinsic parameters indicating positions and orientations of the object imaging units 1 (positions and orientations of the cameras), intrinsic parameters related to the optical systems in the object imaging units 1, and the like.

The three-dimensional shape estimation unit 4 outputs the generated three-dimensional models of the objects and the captured images to the storage unit 8 for storage. In the present exemplary embodiment, the objects treated in the foreground are human figures and items handled by these human figures that are subjects for three-dimensional model generation. In a case of a soccer game or the like, for example, human figures such as players and referees and a ball are subjects for three-dimensional model generation.

The background imaging unit 2 is installed at an angle of view and in an imaging direction to capture images of imaging areas such as spectators' stands in a stadium, and acquires the captured images of the imaging areas as background captured images. In the present exemplary embodiment, the background imaging unit 2 is a camera dedicated for capturing images of a background with motions and changes such as the spectators' stands, and the images captured by the background imaging unit 2 are treated as background images. Although described below in detail, in the present exemplary embodiment, the background captured images acquired by the background imaging unit 2 are corrected by the correction unit 6 described below and then output to the background texture generation unit 7.

The background texture generation unit 7 performs a geometrical conversion of the background captured images to generate background texture images indicating color information of background three-dimensional models. In the present exemplary embodiment, the background texture generation unit 7 acquires background three-dimensional shape models stored in advance in a predetermined storage device. The background texture images and the background three-dimensional models acquired by the background texture generation unit 7 are output to and stored in the storage unit 8. The background in the present exemplary embodiment includes the ground surface and structures that are physical matters other than the objects in the foreground described above. In addition, human figures such as spectators that are not subjects for generation of object three-dimensional models are also included in the background.

The storage unit 8 stores (saves) the captured images and the object three-dimensional models input from the three-dimensional shape estimation unit 4 and the background three-dimensional models and the background texture images input from the background texture generation unit 7.

The image generation unit 9, based on a position and orientation of a virtual viewpoint input by the user from the operation display unit 10 and information of time, acquires data corresponding to the time (i.e., data of the captured images and the object three-dimensional models, and the data of the background three-dimensional models and the background texture images) from the storage unit 8. The image generation unit 9 draws the background corresponding to the virtual viewpoint from the background three-dimensional models and the background texture images among the acquired data, draws the objects corresponding to the virtual viewpoint from the object three-dimensional models and the captured images. Then, the image generation unit 9 generates an image including the background and the objects as a virtual viewpoint image, and outputs the same to the operation display unit 10. Accordingly, the virtual viewpoint image is displayed on a screen of the operation display unit 10.

Figure 3A:
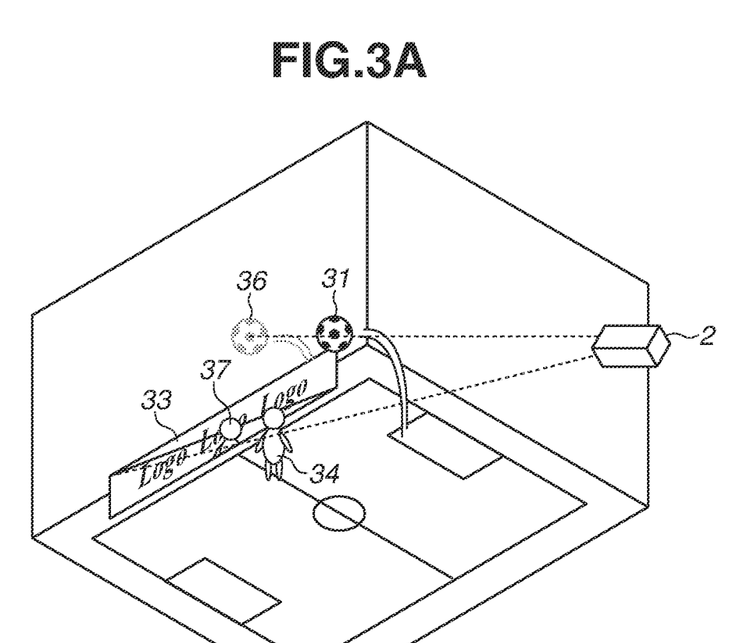
FIGS. 3A and 3B are explanatory diagrams of an example where silhouettes of objects are projected onto a background image.
Figure 3B:
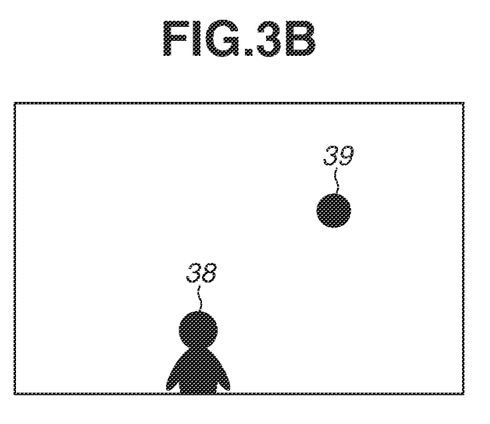

A case where the background texture generation unit 7 handles an image obtained by directly subjecting a background captured image to geometrical conversion, as a background texture image, will be discussed. Assuming that objects illustrated in FIG. 3A (a soccer ball 31 and a human figure 34 in this example) partially exist within the angle of view of the background imaging unit 2, the images of the objects are seen in the background captured image acquired by the background imaging unit 2. For example, if the soccer ball 31 bounced high and comes within the angle of view of the background imaging unit 2, the soccer ball 31 may be reflected in the background texture image attached to the model of the spectators' stands in the background as illustrated in FIG. 3A. Similarly, as for an electronic billboard 33 with dynamic changes in display around the soccer field, if the human figure 34 in front of the electronic billboard 33 comes within the angle of view of the background imaging unit 2, the human FIG. 34 overlaps the electronic billboard 33 in the background captured image. As a result, the human figure 34 may be reflected in the background texture image associated with the model of the electronic billboard 33 in the background. In a case where a virtual viewpoint image is generated using such the background texture image, the soccer ball 31 and a residual image 36 of the ball are drawn in the virtual viewpoint image, and the human figure 34 and a residual image 37 of the human figure are drawn in the virtual viewpoint image. Consequently, audiences of the virtual viewpoint image may have a feeling of strangeness and get confused. In addition, the image in which such residual images are reflected is low in quality due to its disability of correctly expressing the real space.

Thus, the image processing system in the present exemplary embodiment generates a virtual viewpoint image using a background texture image without the residual image 36 of the ball and the residual image 37 of the human figure described above. To this end, the object detection unit 5 acquires the object three-dimensional models from the three-dimensional shape estimation unit 4. The object detection unit 5 then projects the object three-dimensional models onto an image equivalent to the image captured by the background imaging unit 2, based on the extrinsic parameters indicating a position and orientation of the background imaging unit 2 (a position and orientation of the camera) and the intrinsic parameters related to the optical system in the background imaging unit 2. The object detection unit 5 acquires these parameters from the background imaging unit 2.

In a state illustrated in FIG. 3A, for example, the object three-dimensional model of the soccer ball 31 is projected onto a silhouette region 39 in the background captured image acquired by the background imaging unit 2, and the object three-dimensional model of the human figure 34 is projected onto a silhouette region 38. The object detection unit 5 then detects the regions onto which the silhouettes are projected in the background captured image acquired by the background imaging unit 2 as object regions (hereinafter, called silhouette object regions), and transmits information representing the silhouette object regions to the correction unit 6. The silhouette regions indicated by the information transmitted to the correction unit 6 can each have shapes of the projected silhouettes themselves or can have shapes inflated from the silhouettes in consideration of the accuracy of the three-dimensional shape estimation unit 4 and the like. Otherwise, the object detection unit 5 can transmit object regions in a rectangular shape containing the silhouette regions (hereinafter, called rectangular object regions) to the correction unit 6. The information on the rectangular object regions output to the correction unit 6 can have only coordinate data of the four vertexes of the rectangular shape, which allows for reduction of data amount.

The correction unit 6 performs image correction processing on the background captured images input from the background imaging unit 2 to remove the objects reflected in the silhouette object regions described above. To implement the image correction processing, the correction unit 6 holds the input background captured images in succession for each predetermined time period.

Figure 4:
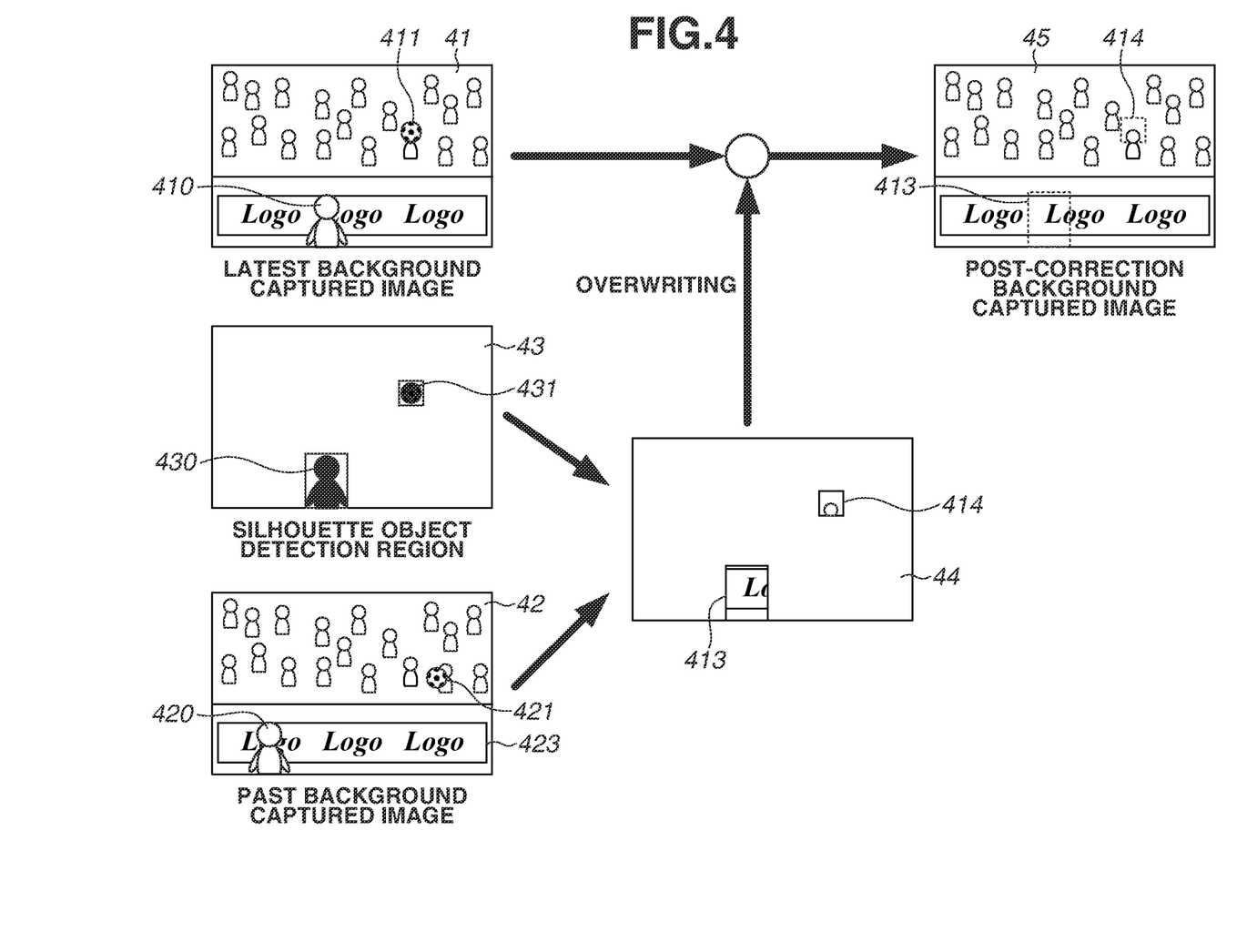
FIG. 4 is an explanatory diagram of image correction processing according to one or more aspects of the present disclosure.

FIG. 4 illustrates a latest (current) background captured image 41, a past background captured image 42 held by the correction unit 6, a silhouette image 43 representing a silhouette object detection region detected by the object detection unit 5, and a post-image correction processing background captured image 45 based on the foregoing images. The latest background captured image 41 illustrated in FIG. 4 reflects a human figure 410 and a soccer ball 411 due to non-execution of the image correction processing by the correction unit 6. The past background captured image 42 also reflects a human figure 420 and a soccer ball 421 due to non-execution of the image correction processing by the correction unit 6. The silhouette image 43 indicates the silhouette object regions detected by the object detection unit 5 and their positions in the latest background captured image 41. In the example of FIG. 4, rectangular object regions 430 and 431 and their positions are detected.

The correction unit 6 performs image correction processing on the regions of the human figure 410 and the soccer ball 411 in the latest background captured image 41 to overwrite with the equivalent regions in the past background captured image 42 as illustrated in FIG. 4. In this case, the correction unit 6 extracts, from the past background captured image 42, regions corresponding to the rectangular object regions 430 and 431 in the silhouette image 43 detected by the object detection unit 5 in the latest background captured image 41. An extracted object region image 44 illustrated in FIG. 4 is obtained by extracting the regions corresponding to the rectangular object regions 430 and 431 from the past background captured image 42. The rectangular regions 413 and 414 in the extracted object region image 44 are regions extracted from the past background captured image 42 corresponding to the rectangular object regions 430 and 431 in the silhouette image 43. The correction unit 6 then overwrites the latest background captured image 41 with the rectangular regions 413 and 414 in the extracted object region image 44. Accordingly, the post-correction background captured image 45 turns into an image where the human figure 410 and the soccer ball 411 are removed from the latest background captured image 41. The correction unit 6 outputs the post-correction background captured image 45 to the background texture generation unit 7.

Figure 8:
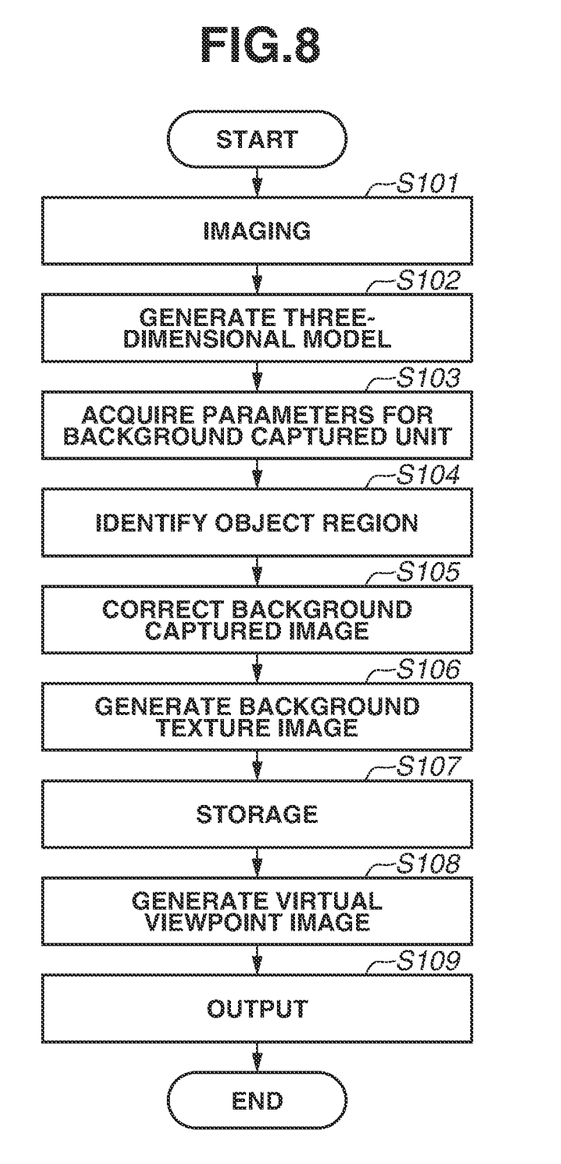
FIG. 8 is a flowchart illustrating an image processing method according to one or more aspects of the present disclosure.

An image processing method executed by the image processing system in the present exemplary embodiment will be described with reference to FIG. 8.

In step S101, the plurality of object imaging units 1 and the background imaging unit 2 perform synchronized imaging. In step S102, the three-dimensional shape estimation unit 4 generates a three-dimensional model of an object, using the captured images acquired by the plurality of object imaging units 1, the intrinsic parameters indicating the positions and orientations of the plurality of object imaging units 1, and the like. In step S103, the object detection unit 5 acquires intrinsic parameters and extrinsic parameters for the background imaging unit 2.

In step S104, the object detection unit 5 projects the three-dimensional model of the object toward the viewpoint of the background imaging unit 2 (the background captured image) based on the intrinsic parameters and the extrinsic parameters for the background imaging unit 2 acquired in step S103. Thus, an object region is identified in the background captured image. In step S105, the correction unit 6 corrects pixel values of pixels included in the object region in the background captured image. In step S106, the background texture generation unit 7 generates a background texture image based on the corrected background captured image.

In step S107, the storage unit 8 stores the background texture image. The storage unit 8 also stores the captured images, the three-dimensional model of the object, and the three-dimensional model of the background. In step S108, the image generation unit 9 generates a virtual viewpoint image using the background texture image and the like stored in the storage unit 8. In step S109, the image generation unit 9 outputs the generated virtual viewpoint image to the operation display unit 10.

In the first exemplary embodiment, performing the image correction processing as described above makes it possible to remove an object in the foreground that would be reflected in the background captured image and the background texture image generated from the background captured image. Then, generating the virtual viewpoint image using the background texture image from which the object in the foreground is removed makes it possible to inhibit display of a virtual viewpoint image that would cause a feeling of strangeness because of the reflection of a residual image of the foreground object in the background.

In the exemplary embodiment described above, the three-dimensional shape estimation unit 4 is configured to extract the silhouette object regions, for example. However, the present disclosure is not limited to this configuration. For example, the object imaging units 1 can have a function of extracting the silhouette object regions. In this case, the object imaging units 1 can cut out the extracted silhouette object regions or the rectangular object regions containing the silhouettes from the captured images to transmit the same to the three-dimensional shape estimation unit 4. According to this configuration, it is possible to distribute the processing load of extracting the silhouettes of objects among the object imaging units 1.

Besides the object imaging units 1, an extraction unit to extract silhouette object regions can be separately provided. In the exemplary embodiment described above, there is no particular limitation on a method for extracting the silhouette object regions. For example, the extraction of the silhouette object regions can be implemented by acquiring an image reflecting no object in advance and extracting the object regions through comparison with the acquired image using a background difference method (background subtraction method). Moreover, the object regions can be extracted by machine learning of human shapes as the objects.

In the exemplary embodiments described above, outputs of the three-dimensional shape estimation unit 4 and the background texture generation unit 7 are stored in the storage unit 8. However, the outputs do not necessarily need to be stored in the storage unit 8. For example, for use purposes not requiring retroactive generation of images, the outputs of the three-dimensional shape estimation unit 4 and the background texture generation unit 7 can be directly input to the image generation unit 9.

In the exemplary embodiments described above, operations from image capturing to image generation are performed by one image processing system. However, these operations do not necessarily need to be performed by one image processing system. These operations can be performed by separate devices, for example, such that the operations up to recording on the storage unit 8 are performed by a virtual viewpoint image material generation device, and the operation of generating a virtual viewpoint image using the material recorded on the storage unit 8 is performed by a virtual viewpoint image generation device.

In the exemplary embodiments described above, the object detection unit 5 is configured to acquire object three-dimensional models from the three-dimensional shape estimation unit 4. However, the present disclosure is not limited to this configuration. For example, the object detection unit 5 can be configured to acquire object three-dimensional models stored and saved in the storage unit 8.

In the exemplary embodiments described above, the background imaging unit 2 is described as a single imaging device for the sake of simplification. However, the present disclosure is not limited to this configuration. In actual imaging, a plurality of background imaging units 2 will be desirably provided because it may be necessary to capture images from four directions and upward and downward directions, and occlusion becomes likely to occur depending on the structure in the background. The plurality of background imaging units 2 captures images at least at different angles. In that case, the object detection unit 5 projects object three-dimensional models based on respective extrinsic parameters and intrinsic parameters for the plurality of background imaging units 2, and determines silhouette object regions each corresponding to the plurality of background imaging units 2.

In a case of capturing images of the background by the plurality of background imaging units 2 as described above, the background captured images can overlap each other. In this case, in a case where the installation positions of two or more background imaging units 2 with partially overlapping imaging ranges are greatly separated, the positions where the object is reflected may differ from each other. Thus, the correction unit 6 can make a correction to the object region in the relevant background captured image, by acquiring an image at the relevant position from another background captured image that partially overlaps in imaging range with the relevant background captured image, and then overwriting the relevant background captured image with the acquired image.

In the exemplary embodiments described above, the silhouette shapes of the detected objects are inflated or extended to a rectangle by the object detection unit 5. However, the object detection unit 5 does not necessarily need to perform these operations. For example, the correction unit 6 can inflate the silhouette shape or extend the same to a rectangle based on the object regions output by the object detection unit 5.

The image correction processing by the correction unit 6 is not limited to replacement of the latest background captured image with the past background captured image. For example, the latest background captured image can be replaced with portions of an image in the same frame similar to the portions to be corrected or can be replaced using an average of pixel values of pixels in the temporally preceding and following background captured images. In addition, the background captured image to be corrected can be complemented by an image reflecting no object that has been captured by another background imaging unit 2.

In the image correction processing, the region to be corrected can be made less prominent in a specific color determined based on the pixel values of pixels in the region to be corrected. For example, the specific color can be black or a camouflage color. The specific color can be the same type of color as that of an item worn by many of spectators at the spectators' stands. Examples of an item include a uniform replica and a towel of a team.

In the image correction processing, the pixel values of pixels in the region to be corrected can be compensated and determined based on the pixel values of pixels in surrounding regions.

Figure 5:
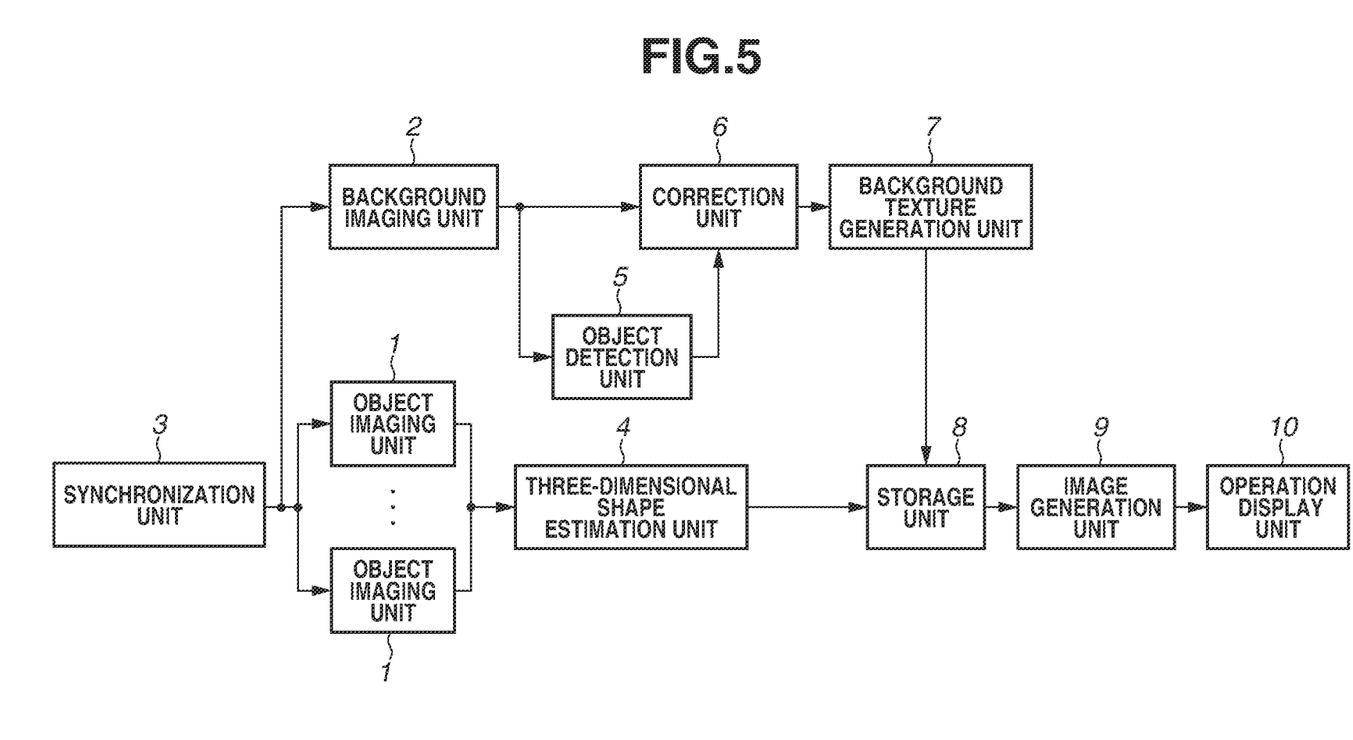
FIG. 5 is a diagram illustrating a configuration example of a system including an image processing apparatus according to one or more aspects of the present disclosure.

FIG. 5 is a diagram illustrating a configuration example of an image processing system including an image processing apparatus according to a second exemplary embodiment. The configuration of the image processing system illustrated in FIG. 5 is generally the same as the configuration of the image processing system in the first exemplary embodiment illustrated in FIG. 1. However, the example illustrated in FIG. 5 is different from the example illustrated in FIG. 1 in operations of an object detection unit 5, connection of the object detection unit 5 with surrounding components, and operations of a correction unit 6. Hereinafter, only parts of the configuration and operations illustrated in FIG. 5 different from those illustrated in FIG. 1 will be described. Duplicated description of the same operations of an object imaging unit 1, a background imaging unit 2, a synchronization unit 3, a three-dimensional shape estimation unit 4, the object detection unit 5, the correction unit 6, a background texture generation unit 7, a storage unit 8, an image generation unit 9, and an operation display unit 10 as those of the corresponding units illustrated in FIG. 1 will be omitted.

In the second exemplary embodiment, the object detection unit 5 acquires background captured images acquired by the background imaging unit 2. The object detection unit 5 holds background captured images corresponding to a predetermined time period among the acquired background captured images. The object detection unit 5 determines a differential image between the latest background captured image and the past background captured image. For the differential image, the object to be detected and the matters in motion in the background are extracted. The object detection unit 5 further determines an assumed size, color, and shape of the object among the extracted matters, and determines a moving speed of the object through comparison with a plurality of past images. The object detection unit 5 then detects the object based on the determined features, and outputs the detected object to the correction unit 6 as a silhouette object region.

The correction unit 6 performs image correction to remove the object part in the silhouette object region input from the object detection unit 5, from the background captured image input from the background imaging unit 2. Specifically, the correction unit 6 generates colors and patterns similar to the colors and patterns of pixels in a region surrounding the input silhouette object region, and overwrites the silhouette object region with the generated colors and patterns. In this case, although the post-correction image is different from the pre-correction image in a precise sense, the pre-correction image is corrected to the post-correction image where it is hard to recognize by the human eyes that the object was previously reflected. The correction unit 6 outputs the post-correction background captured image to the background texture generation unit 7.

Structures and operations of other components are similar to those in the first exemplary embodiment. The storage unit 8 stores virtual viewpoint image materials, and the image generation unit 9 generates a virtual viewpoint image based on the stored virtual viewpoint image materials. Thus, in the second exemplary embodiment, as in the first exemplary embodiment, it is possible to remove the reflected object from the background captured image and the background texture image generated from the background captured image. According to the second exemplary embodiment, it is possible to inhibit the object generated from the object three-dimensional model and the captured images and the object reflected in the background from being multiply displayed in the virtual viewpoint image.

In the second exemplary embodiment, as compared to the first exemplary embodiment, the amount of calculation for object detection processing by the object detection unit 5 is decreased so that the object can be detected only by the captured images acquired by the background imaging unit 2. Thus, for example, the object detection unit 5 and the correction unit 6 can be included in the background imaging unit 2. On the other hand, the first exemplary embodiment is capable of increasing the accuracy of object region detection. The image processing in the second exemplary embodiment is suited for detection of a matter moving at a high speed such as a ball. However, objects in a slow motion and objects in a large motion such as human figures, for example, may stay at the same place for a certain period of time or may have a movement amount that is smaller than the size of the object. For such a case, separate object detection units can be used for the angle of view and the region, such that the object detection unit in the present exemplary embodiment is applied to detect a ball at the spectators' stands, whereas the object detection unit in the first exemplary embodiment is applied to object detection within the angle of view where an object as a human figure might be reflected.

In the second exemplary embodiment, the object detection unit 5 detects the object based on the size, color, and shape of the object among the extracted matters, and the moving speed of the object determined through comparison with a plurality of past images. To this end, an estimation unit using machine learning can be employed. In a case of using machine learning, the object can be detected using a machine learning technology such as deep learning, without extracting features such as color and shape in advance.

Similarly, the correction unit 6 can be configured to switch between the image correction method implemented by the correction unit 6 in the first exemplary embodiment and the image correction method implemented by the correction unit 6 in the second exemplary embodiment, based on patterns in the background captured image or types of the reflected objects. That is, the correction unit 6 can switch, depending on the parts of the image, between the processing for projecting a three-dimensional shape and detecting the object region as in the first exemplary embodiment and the processing for detecting the object region based on a differential image as in the second exemplary embodiment.

In the second exemplary embodiment, the object imaging units 1 and the background imaging unit 2 do not necessarily need to be in synchronization with each other. Thus, the synchronization unit 3 can be configured to synchronize only the plurality of object imaging units 1.

Figure 9:
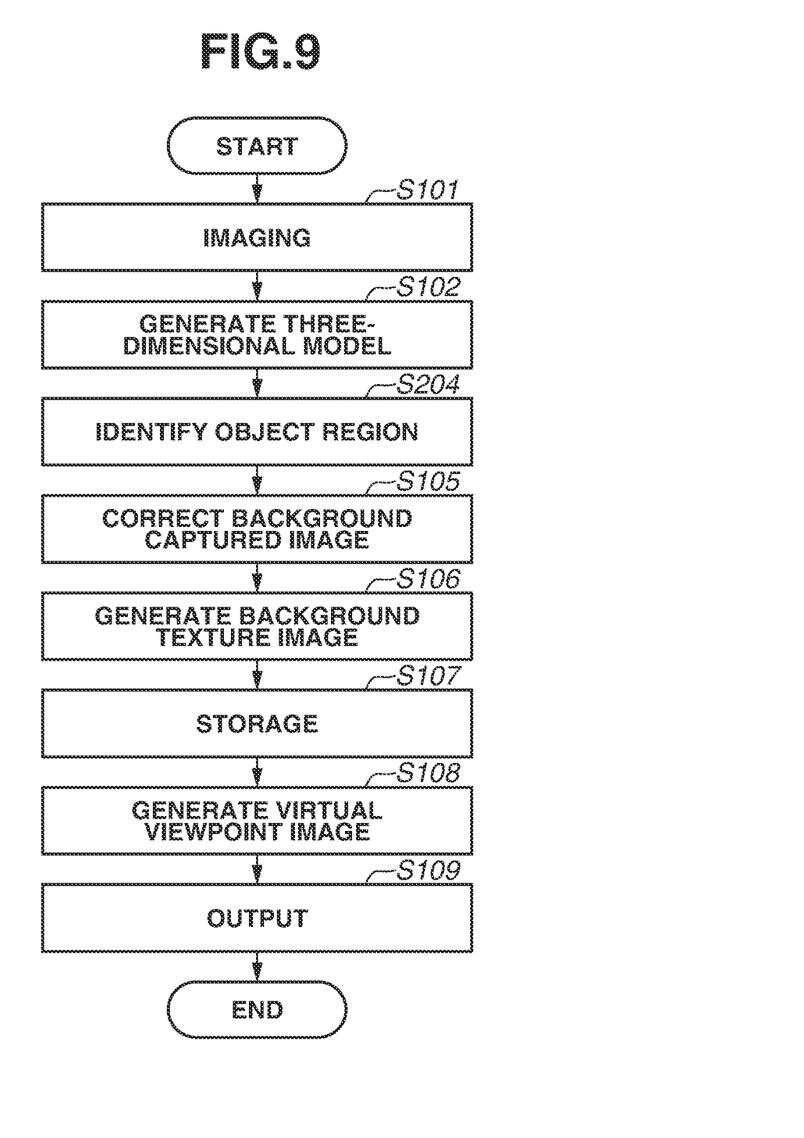
FIG. 9 is a flowchart illustrating an image processing method according to one or more aspects of the present disclosure.

An image processing method executed by the image processing system in the present exemplary embodiment will be described with reference to FIG. 9. In FIG. 9, the same steps as those in the first exemplary embodiment are denoted with the same reference numerals as used in FIG. 8.

In step S101, the plurality of object imaging units 1 and the background imaging unit 2 perform synchronized imaging. In step S102, the three-dimensional shape estimation unit 4 generates a three-dimensional model of an object using the captured images acquired by the plurality of object imaging units 1, intrinsic parameters indicating positions and orientations of the plurality of object imaging units 1, and the like.

In step S204, the object detection unit 5 identifies an object region in the background captured images. Specifically, the object detection unit 5 determines a differential image between the latest background captured image and the past background captured image. Then, based on the differential image, the object detection unit 5 identifies a region with motions as an object region.

In step S105, the correction unit 6 corrects pixel values of pixels included in the object region in the background captured image. In step S106, the background texture generation unit 7 generates a background texture image based on the corrected background captured image. In step S107, the storage unit 8 stores the background texture image. The storage unit 8 also stores the captured images, the three-dimensional model of the object, and the three-dimensional model of the background. In step S108, the image generation unit 9 generates a virtual viewpoint image using the background texture image and the like stored in the storage unit 8. In step S109, the image generation unit 9 outputs the generated virtual viewpoint image to the operation display unit 10.

Figure 6:
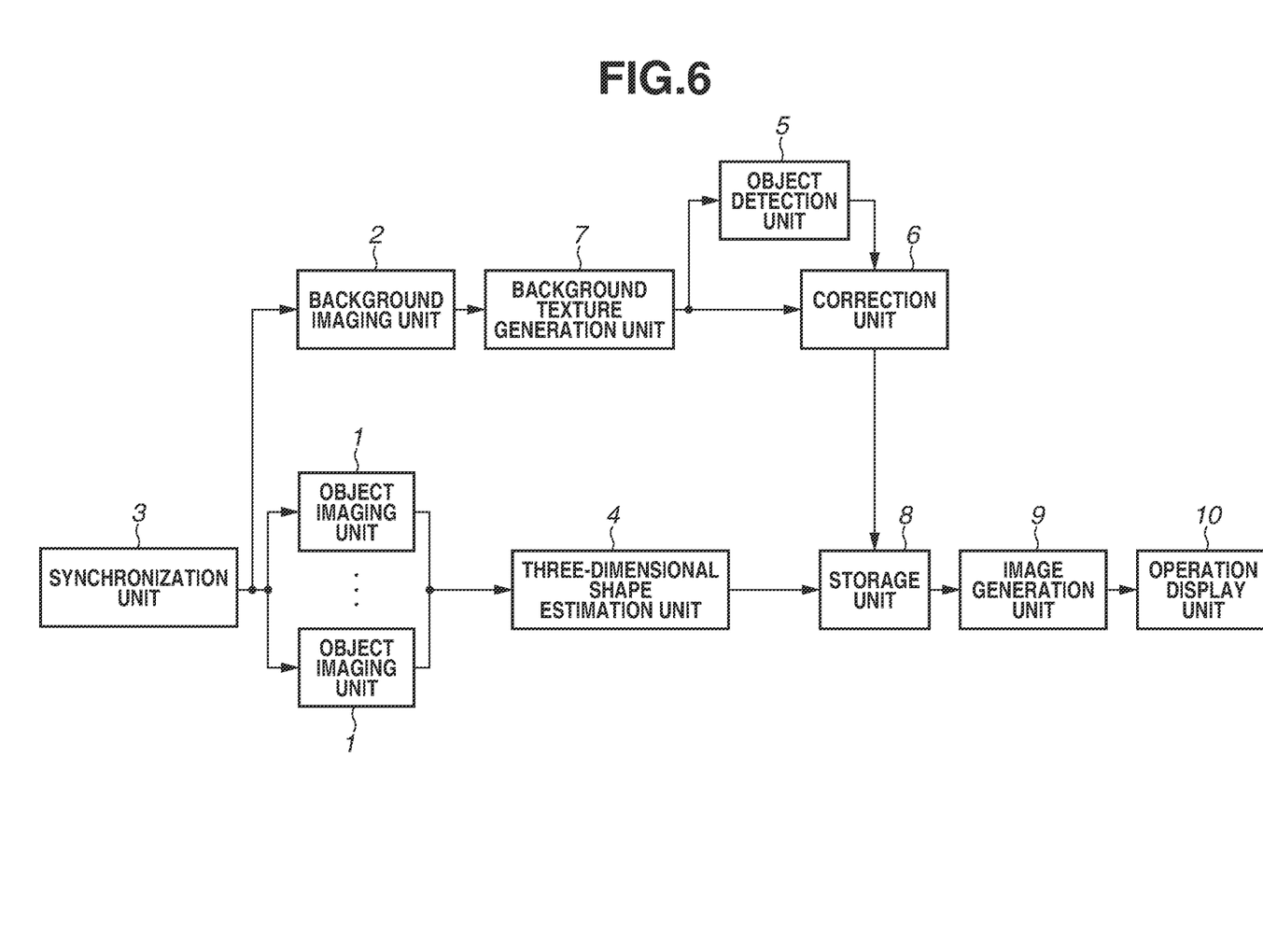
FIG. 6 is a diagram illustrating another configuration example of the system according to one or more aspects of the present disclosure.

In the present exemplary embodiment, the image correction is performed on the background captured image to detect the silhouette object region and remove the object. However, the present disclosure is not limited to this. For example, as illustrated in FIG. 6, the detection of the object region and the correction can be performed on the background texture image generated by the background texture generation unit 7. The configuration of the image processing system illustrated in FIG. 6 is generally the same as the configuration illustrated in FIG. 5. However, the example of FIG. 6 is different from the example of FIG. 5 in the relationship of connection among the object detection unit 5, the background texture generation unit 7, and the correction unit 6. That is, in the configuration of FIG. 6, the background captured image acquired by the background imaging unit 2 is output to the background texture generation unit 7, and an output of the background texture generation unit 7 is transmitted to the object detection unit 5 and the correction unit 6. Then, an output of the correction unit 6 is transmitted to the storage unit 8. Duplicated description of the same operations of the object imaging unit 1, the background imaging unit 2, the synchronization unit 3, the three-dimensional shape estimation unit 4, the object detection unit 5, the correction unit 6, the background texture generation unit 7, the storage unit 8, the image generation unit 9, and the operation display unit 10 as those of the corresponding units illustrated in FIG. 1 will be omitted.

In the configuration example of FIG. 6, the object detection unit 5 performs the processing as described above to detect the silhouette object region in the background texture image. Then, the correction unit 6 performs the image correction processing to remove the object using the background texture image from the background texture generation unit 7 and the silhouette object region from the object detection unit 5. Accordingly, in the configuration example of FIG. 6, it is possible to remove the object reflected in the background texture image. The configuration for removing the object from the background texture image as illustrated in FIG. 6 may be possible to decrease the amount of calculation as compared to the processing for removing the object from the background captured image. This is because the whole background captured image is not used for the background texture image, and in a case of performing object removal processing on the background captured image, the object is detected and removed in the parts of the background captured image not to be used for the background texture image.

<Other Configurations>

The processing unit each illustrated in FIGS. 1, 5, and 6 is configured by hardware. Alternatively, the processing performed by the processing unit illustrated in each of these drawings can be implemented by executing computer programs.

Figure 7:
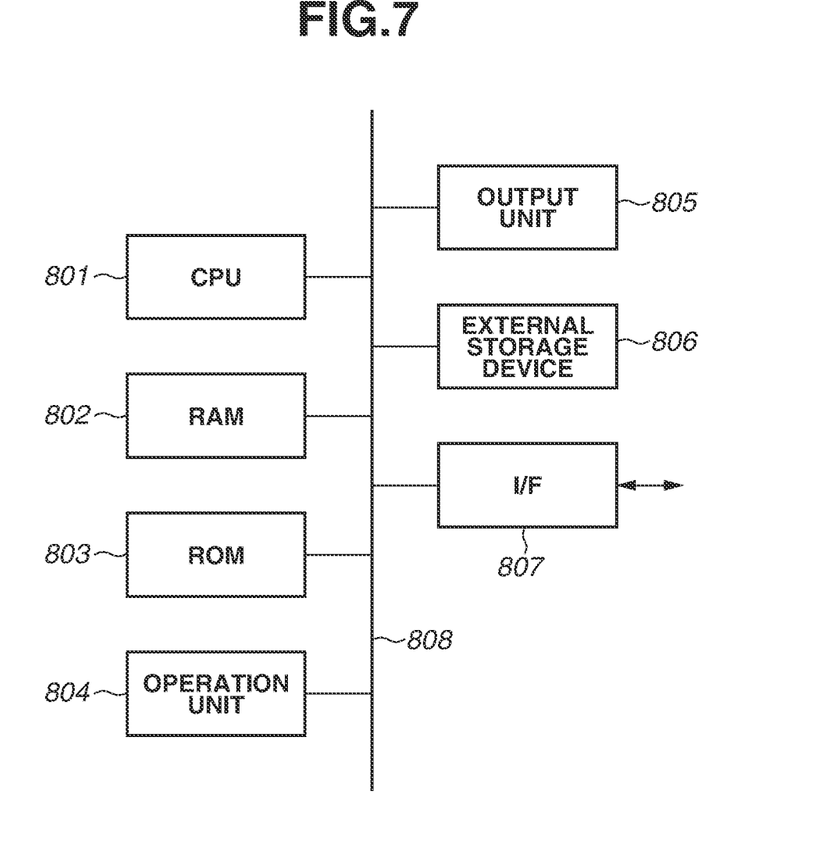
FIG. 7 is a diagram illustrating a configuration example of a computer applicable to an image processing apparatus.

FIG. 7 is a block diagram illustrating a configuration example of hardware in a computer applicable to the image processing apparatus according to each of the exemplary embodiments described above.

Referring to FIG. 7, a central processing unit (CPU) 801 controls the entire computer using computer programs and data stored in a random access memory (RAM) 802 or a read only memory (ROM) 803, and executes the processing that has been described as being performed by any of the image processing apparatuses in the exemplary embodiments described above. That is, the CPU 801 serves as the processing unit each illustrated in FIGS. 1, 5, and 6.

The RAM 802 has areas for temporarily storing computer programs and data loaded from an external storage device 806, data externally acquired via an interface (I/F) 807, and the like. The RAM 802 further has a work area to be used by the CPU 801 to execute various kinds of processing. That is, for example, the RAM 802 can be allocated as a frame memory or can provide other various areas as appropriate.

The ROM 803 stores setting data and boot programs for the computer. An operation unit 804 includes a keyboard, a mouse, or the like, and is operated by the user of the computer to input various instructions to the CPU 801. An output unit 805 displays results of processing by the CPU 801. The output unit 805 includes a liquid crystal display, for example. The operation display unit 10 includes the operation unit 804 and the output unit 805.

An external storage device 806 is a large-capacity information storage device that is typified by a hard disk drive device. The external storage device 806 stores an operating system (OS) and computer programs for allowing the CPU 801 to implement the functions of the processing unit each illustrated in FIGS. 1, 5, and 6. The external storage device 806 can further store image data to be processed.

The computer programs and data stored in the external storage device 806 are loaded as appropriate to the RAM 802 under the control of the CPU 801, and are to be processed by the CPU 801. The I/F 807 can be connected to networks such as a local area network (LAN) and the internet, and other devices such as a projection device and a display device. The computer can acquire and transmit various kinds of information via the I/F 807. In the present disclosure, the object imaging units 1 and the background imaging unit 2 are connected to the I/F 807 to input captured images and control those images. A bus 808 connects together the units described above.

As for the operations of the components described above, the operations in the exemplary embodiments described above are controlled mainly by the CPU 801.

The exemplary embodiments described above are all mere examples of embodiments in carrying out the present disclosure. The technical scope of the present disclosure should not be interpreted in a limited way due to these exemplary embodiments. That is, the present disclosure can be carried out in various forms without deviating from its technical ideas or principal features.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-048906, filed Mar. 19, 2020, which is hereby incorporated by reference herein in its entirety.

What is claimed is:

1. An image processing apparatus comprising:
one or more memories storing instructions; and
one or more processors executing the instructions to:
acquire a parameter for identifying a position and orientation of a first imaging device;
acquire three-dimensional shape data of an object that is generated based on a plurality of images acquired by a plurality of second imaging devices different from the first imaging device; and correct a pixel value of a pixel included in a region corresponding to the object in an image acquired by the first imaging device, based on the position and orientation of the first imaging device identified based on the acquired parameter and the acquired three-dimensional shape data of the object, the region corresponding to the object in the image acquired by the first imaging device being identified by projecting the three-dimensional shape data of the object toward a viewpoint of the first imaging device, based on the position and orientation of the first imaging device identified based on the acquired parameter.

2. The image processing apparatus according to claim 1, wherein the pixel value of the pixel included in the region corresponding to the object in the image acquired by the first imaging device is corrected based on an image acquired in the past by the first imaging device.

3. The image processing apparatus according to claim 2, wherein the pixel value of the pixel included in the region corresponding to the object in the image acquired by the first imaging device is corrected based on a pixel value of a pixel included in a region corresponding to the region corresponding to the object in the image acquired in the past by the first imaging device.

4. The image processing apparatus according to claim 1, wherein the pixel value of the pixel included in the region corresponding to the object in the image acquired by the first imaging device is replaced with a pixel value of a pixel included in the region corresponding to the region corresponding to the object in the image acquired in the past by the first imaging device.

5. The image processing apparatus according to claim 1, wherein the pixel value of the pixel included in the region corresponding to the object in the image acquired by the first imaging device is corrected based on a pixel value of a pixel not included in the region corresponding to the object in the image acquired by the first imaging device.

6. The image processing apparatus according to claim 1, wherein the pixel value of the pixel included in the region corresponding to the object in the image acquired by the first imaging device is corrected based on a pixel value of a pixel included in a region surrounding the region corresponding to the object in the image acquired by the first imaging device.

7. The image processing apparatus according to claim 1, wherein the pixel value of the pixel included in the region corresponding to the object in the image acquired by the first imaging device is corrected based on an image acquired by a third imaging device different from the first imaging device and the second imaging device.

8. The image processing apparatus according to claim 1, wherein the region corresponding to the object in the image acquired by the first imaging device is inflated or extended.

9. An image processing method comprising:
  acquiring a parameter for identifying a position and orientation of a first imaging device;
  acquiring three-dimensional shape data of an object that is generated based on a plurality of images acquired by a plurality of second imaging devices different from the first imaging device; and
  correcting a pixel value of a pixel included in a region corresponding to the object in an image acquired by the first imaging device, based on the position and orientation of the first imaging device identified based on the acquired parameter and the acquired three-dimensional shape data of the object, the region corresponding to the object in the image acquired by the first imaging device being identified by projecting the three-dimensional shape data of the object toward a viewpoint of the first imaging device, based on the position and orientation of the first imaging device identified based on the acquired parameter.

10. A non-transitory computer-readable recording medium storing a program that causes a computer to execute a method for image processing comprising:
  acquiring a parameter for identifying a position and orientation of a first imaging device;
  acquiring three-dimensional shape data of an object that is generated based on a plurality of images acquired by a plurality of second imaging devices different from the first imaging device; and
  correcting a pixel value of a pixel included in a region corresponding to the object in an image acquired by the first imaging device, based on the position and orientation of the first imaging device identified based on the acquired parameter and the acquired three-dimensional shape data of the object, the region corresponding to the object in the image acquired by the first imaging device being identified by projecting the three-dimensional shape data of the object toward a viewpoint of the first imaging device, based on the position and orientation of the first imaging device identified based on the acquired parameter.

* * * * *